United States Patent
Kaszeta et al.

(10) Patent No.: US 7,158,370 B2
(45) Date of Patent: Jan. 2, 2007

(54) INTEGRATED BATTERY FUSING DEVICE

(75) Inventors: William J. Kaszeta, Mesa, AZ (US); Robert V. D'Aiello, Scottsdale, AZ (US)

(73) Assignee: Communication Power Soutions, Inc., Meaa, AR (US)

(*) Notice: Subject to any disclaimer, the term of this patent is extended or adjusted under 35 U.S.C. 154(b) by 22 days.

(21) Appl. No.: 10/898,648

(22) Filed: Jul. 23, 2004

(65) Prior Publication Data

US 2005/0146825 A1  Jul. 7, 2005

Related U.S. Application Data

(60) Provisional application No. 60/489,386, filed on Jul. 23, 2003.

(51) Int. Cl.
*H02B 1/04* (2006.01)

(52) U.S. Cl. ............... 361/628; 361/642; 361/643; 361/626

(58) Field of Classification Search ............... 337/398
See application file for complete search history.

(56) References Cited

U.S. PATENT DOCUMENTS

| | | | | |
|---|---|---|---|---|
| 4,368,455 A | * | 1/1983 | Menard | 340/431 |
| 4,778,398 A | * | 10/1988 | Ahroni | 439/143 |
| 5,590,019 A | * | 12/1996 | Fox et al. | 361/643 |
| 5,806,948 A | * | 9/1998 | Rowan et al. | 312/293.3 |
| 5,923,515 A | * | 7/1999 | Eubanks et al. | 361/104 |
| 6,049,140 A | * | 4/2000 | Alksnat et al. | 307/10.2 |
| 6,157,534 A | * | 12/2000 | Gallagher et al. | 361/683 |
| 6,160,699 A | * | 12/2000 | Gibson et al. | 361/643 |
| 6,176,710 B1 | * | 1/2001 | Ewing et al. | 439/76.1 |
| 6,421,217 B1 | * | 7/2002 | Castonguay et al. | 361/115 |
| 6,442,017 B1 | * | 8/2002 | Ewing et al. | 361/628 |
| 6,512,443 B1 | * | 1/2003 | Matsumura et al. | 337/189 |
| 6,905,372 B1 | * | 6/2005 | Cabrera et al. | 439/709 |

* cited by examiner

*Primary Examiner*—Boris Chervinsky
(74) *Attorney, Agent, or Firm*—Duane Morris LLP

(57) ABSTRACT

An integrated battery fusing device for a battery system of the type used as a backup for powering telecommunications equipment. The fusing device includes a fusing assembly and a terminal plate arrangement that integrally mounts the fusing assembly to the battery system. The terminal plate arrangement includes a first connector for electrically coupling the fusing assembly to the battery system and a second connector for electrically coupling a battery cable to the fusing assembly.

31 Claims, 9 Drawing Sheets

INTEGRATED BATTERY FUSING DEVICE

CROSS-REFERENCE TO RELATED APPLICATIONS

This application claims the benefit under 35 USC 119(e) of U.S. Provisional Application No. 60/489,386, filed on Jul. 23, 2003.

FIELD OF THE INVENTION

This invention relates to battery systems and, more particularly, to an integrated battery fusing device for a battery system.

BACKGROUND OF THE INVENTION

The U.S. National Electrical Code (NEC) (Article 240) requires that conductors such as wire, cable, bus bars, and the like, be protected against overcurrent in accordance with their ampacities, unless specifically exempted for a specific application. Overcurrent, generally caused by short circuits, can produce extreme heat and burning, smoke, and other dangerous conditions in conductors connected to battery systems.

However, overcurrent protection is not being accomplished in many telecommunication applications for several reasons. One primary reason for this is that the NEC, under Article 90-2(b)(4), does not cover "Installations of communications equipment under the exclusive control of communications utilities located outside or in building spaces used exclusively for such installations". This has led to the general use of unfused batteries in communications.

Many municipalities have determined that the exemption under Article 90-2(b)(4) of the NEC does not apply to shared facilities (co-location), customer premise equipment, or other situations where failures in equipment may affect other areas or personnel. A typical situation may involve a tenant improvement for a cellular base station that could expose people working in the building to the effects of a battery short circuit event. Unfortunately, there is a general lack of suitable overcurrent protection devices, such as fuses and circuit breakers, that can be effectively applied to large battery systems.

Accordingly, an overcurrent protection device is needed that can be effectively applied to large battery systems.

DETAILED DESCRIPTION OF THE INVENTION

An aspect of the present invention is an integrated battery fusing device for a battery system. The battery system may be of the type used as a backup for powering telecommunications equipment. The fusing device protects the battery system from overcurrent, generally caused by short circuits, which can produce extreme heat and burning, smoke, and other dangerous conditions in conductors, such as wires, cables, bus bars, etc., connected to the battery system.

Figure 1:
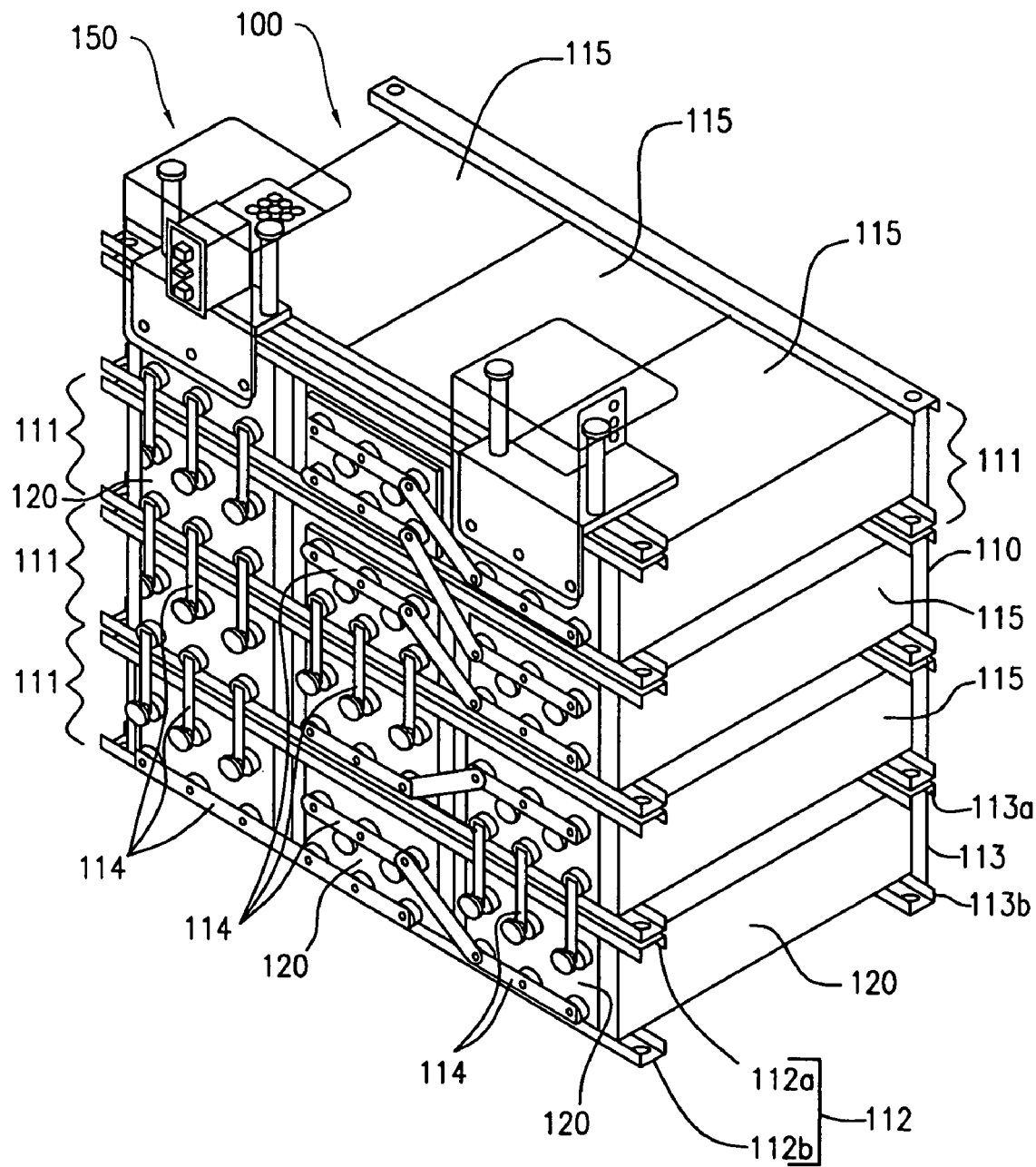
FIG. 1 is a front perspective view of a battery system and a top mounting embodiment of the integrated battery fusing device of the present invention coupled to the battery system.

FIG. 1 is a perspective view of a battery system 100 and a top mounting embodiment of the integrated battery fusing device 150 of the present invention coupled to the battery system 100. The battery system 100 may include a rack mounting system 110 that stacks one or more horizontal arrays of battery cells 120 on top of one another. The rack mounting system 110 may include a plurality of vertically stacked modules 111 that each holds a horizontal array of battery cells 120. The battery cells 120 of the system 100 may be series coupled to one another using terminal connectors 114. Such a battery system is sold by GNB Network Power Division of Exide Technologies, Alpharetta, Ga. under a series of model numbers including, for example, ABSOLYTE IIP 3-100A33. Battery systems available from other manufacturers, such as C&D, East Penn, EnerSys, and the like, may also be used.

As shown in the embodiment of FIG. 1, each module 111 holds a horizontal array of three battery cells 120. One of ordinary skill in the art will of course recognize that the modules 111 can also be sized to hold more or less than three battery cells 120. Each module 111 may include a front coupling assembly 112 for allowing the front portion of the module 111 to be coupled to the front portion of a lower module and/or upper module 111 by ordinary screw fasteners (not shown) or the like, and a rear coupling assembly 113 for allowing the rear portion of the module 111 to be coupled to the rear portion of a lower module and/or upper module 111 by ordinary screw fasteners (not shown) or the like. The front coupling assembly 112 can include upper and lower elongated channel members 112a, 112b disposed opposite and parallel to one another. The rear coupling assembly 113 can include a rigidly connected pair of upper and lower elongated channel members 113a, 113b disposed opposite and parallel to one another. A steel case 115 extends between the coupling assemblies 112, 113 and may be attached thereto by welding, for example. Each steel case 115 is sized to hold one of the battery cells 120.

Figure 2A:
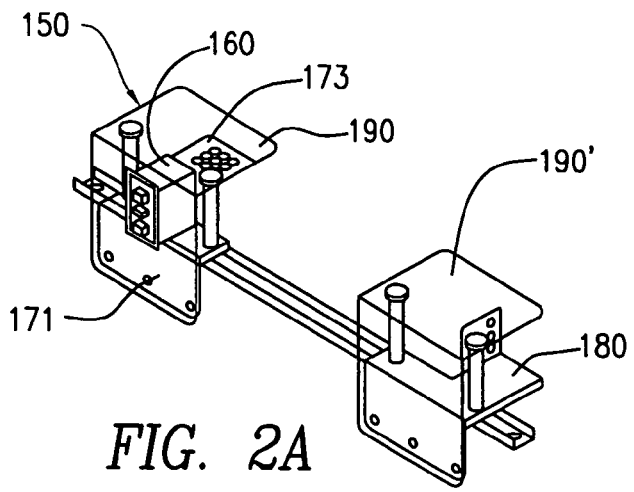
FIG. 2A is a front perspective view of the top mounting embodiment of the integrated battery fusing device of the present invention.
Figure 2B:
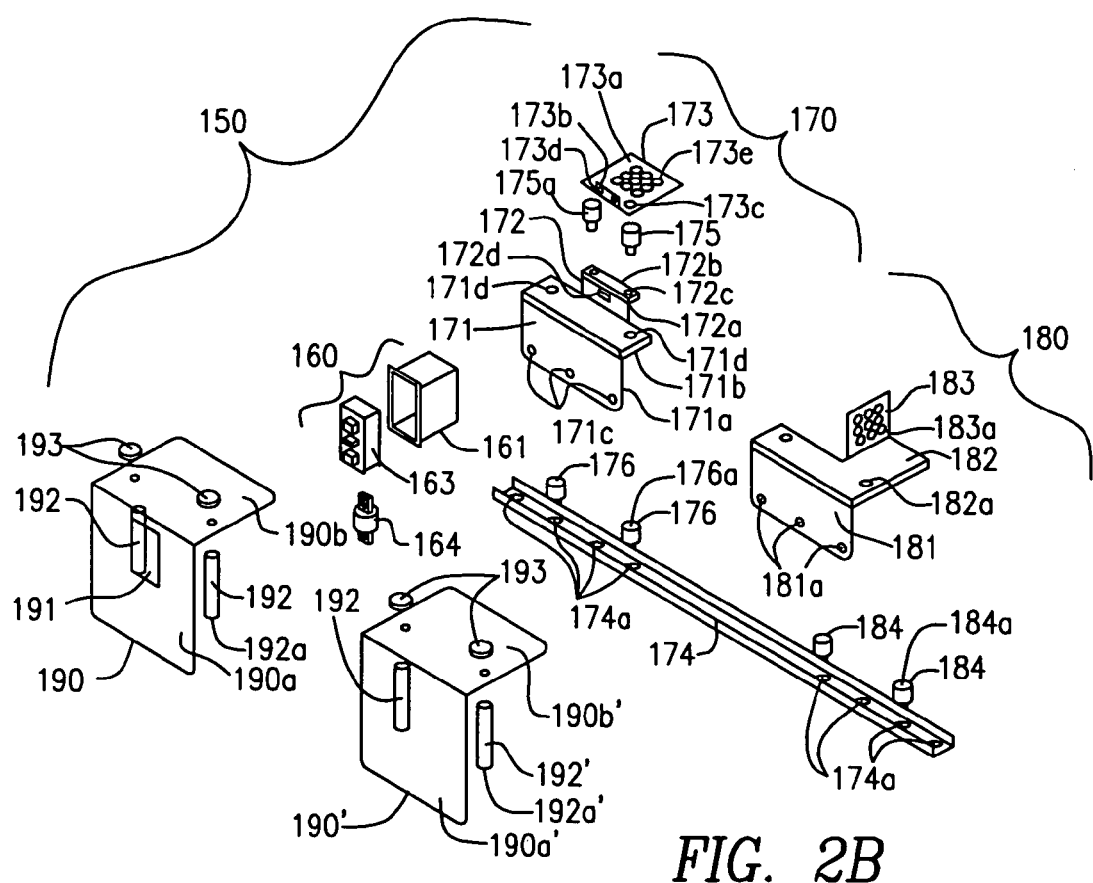
FIG. 2B is a front, exploded perspective view of the top mounting embodiment of the integrated battery fusing device of the present invention.

Referring to FIGS. 2A and 2B, the integrated battery fusing device 150 may include a fusing assembly 160, a terminal plate arrangement 170 that integrally top-mounts the fusing assembly 160 to the battery system 100, an unfused terminal plate arrangement 180, and safety covers 190 and 190'. The terminal plate arrangement 170 allows attachment of one or more battery cables (not shown) to a positive (or negative) side of the battery system 100. The unfused terminal plate arrangement 180 allows attachment of one or more battery cables (not shown) to a negative (or positive) side of the battery system 100. Generally, one polarity of the battery system 100 is at ground potential and not fused, and the fusing devices are in the ungrounded polarity. For example, but not limitation, some telecommunications systems may use a 24-volt design with the negative side grounded, and other systems may use a 48-volt design with the positive side grounded.

Figure 3:
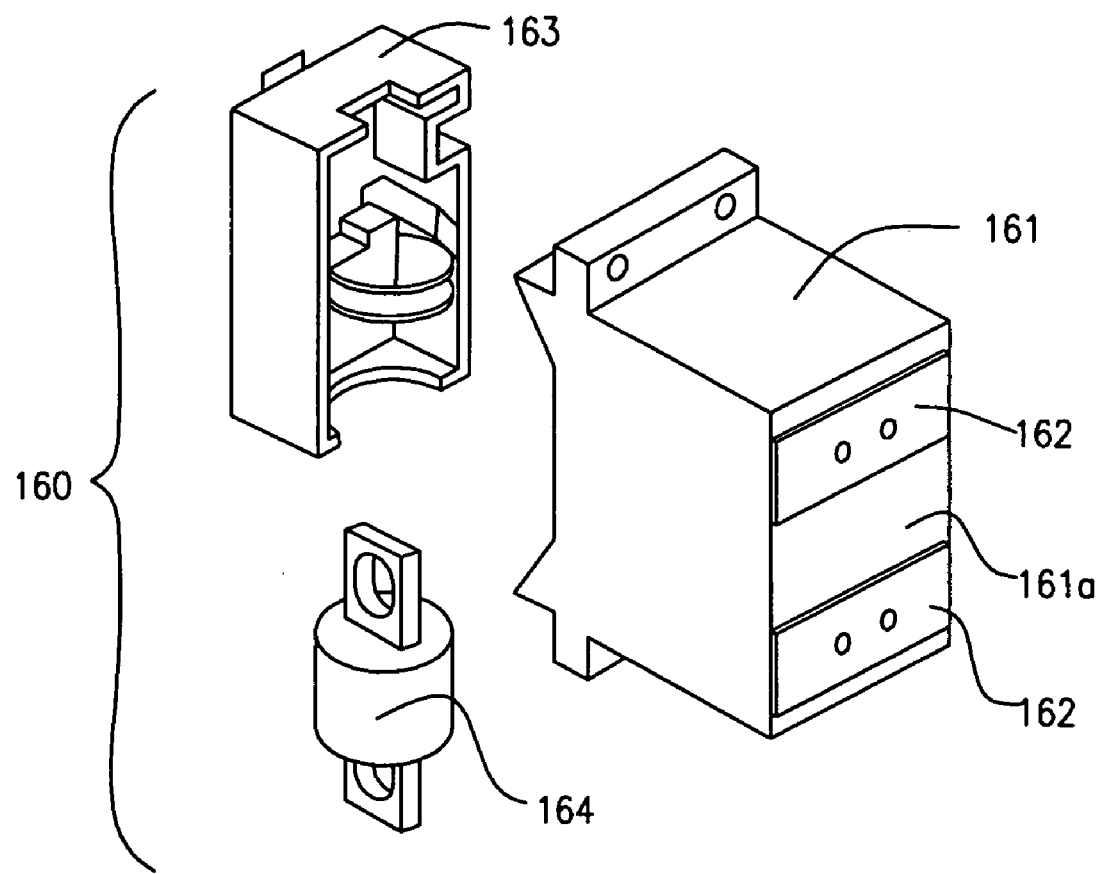
FIG. 3 is a rear, exploded perspective view of a pull-out fuse fusing assembly according to the present invention.

As shown in FIG. 3, the fusing assembly 160 may comprise a conventional pull-out fuse of the type that includes a receptacle-like body section 161, a removable fuseholder section 162 that can be inserted into and removed from the body section 161, and a replaceable fuse 164 which removably mounts inside the fuseholder section 163. The receptacle-like body section 161 typically includes input and output terminals 162, which may be located on a rear wall 161*a* of the body section 161. Such a fusing assembly is readily available from a number of manufacturers including, for example, Bussman Division of Cooper Industries, under part or model number TPHCS using type TPL fuses.

Referring again to FIGS. 2A and 2B, the terminal plate arrangement 170 may include a fuseholder connector 171, a battery terminal connector 173, and a battery system mounting bracket 174. The fuseholder connector 171 may comprise an L-shape bracket formed by a vertically extending lower member 171*a* and a horizontally extending upper member 171*b*. The fuseholder connector 171 may further comprise an L-shape extension 172 projecting up from the rear edge of the horizontally extending upper member 171*b*. The L-shape extension 172 has a vertical mounting flange/terminal contact arm 172*a* and a horizontal support arm 172*b*. The battery terminal connector 173 may comprise a horizontal plate member 173*a* and a second vertical mounting flange/terminal contact arm 173*b* that projects up from the front edge of the plate member 173*a*. The plate member 173*a* includes a plurality of battery cable mounting apertures 173*e* for coupling one or more battery cable to the terminal plate arrangement 170 with conventional fasteners. The battery system mounting bracket 174 may comprise an elongated channel member.

Figure 4:
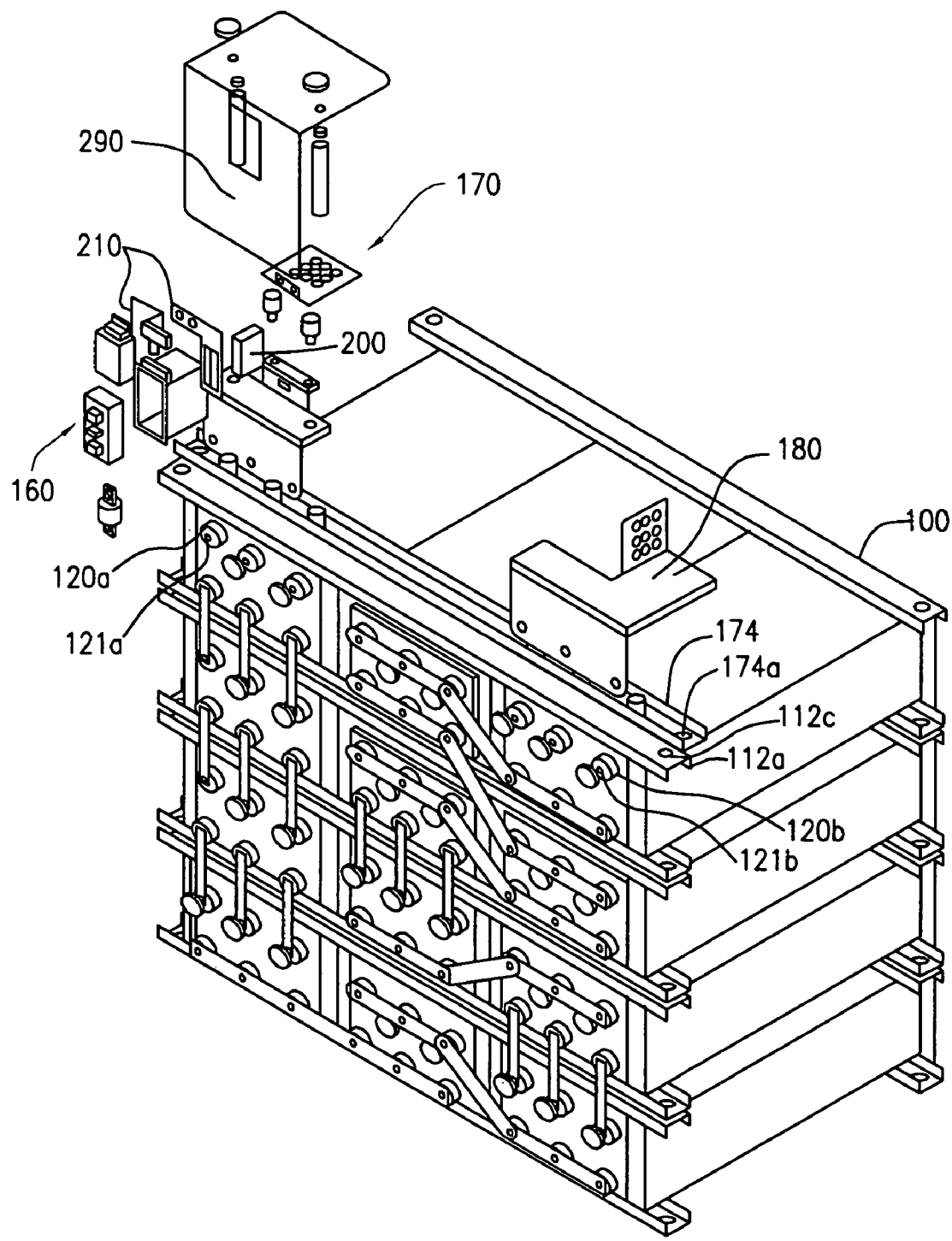
FIG. 4 is a front, exploded perspective view of the top mounting embodiment of the integrated battery fusing device of the present invention that comprises a second embodiment of a safety cover.
Figure 5:
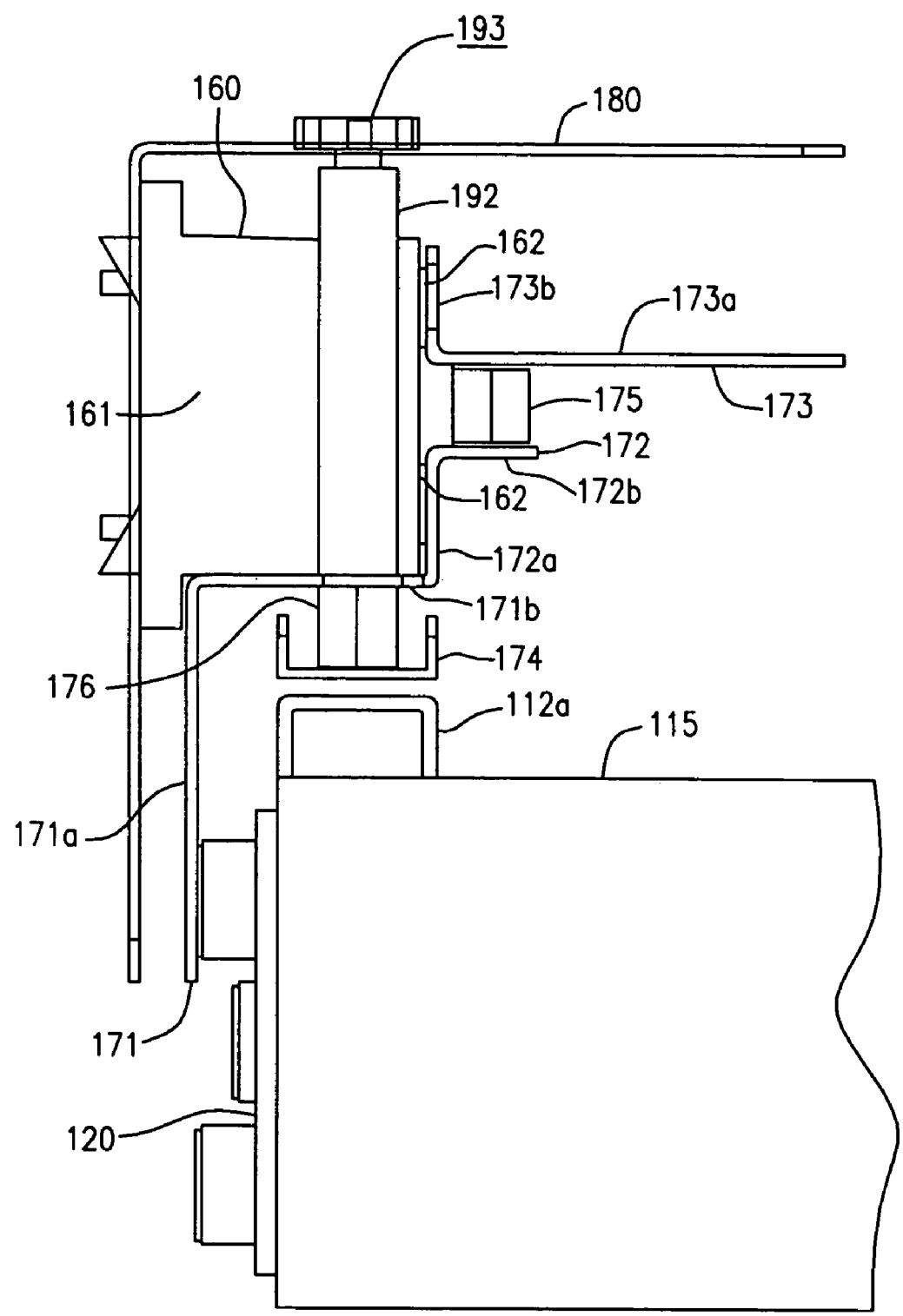
FIG. 5 is a side elevational view showing the top mounting embodiment of the integrated battery fusing device of the present invention mounted to a battery system.

As collectively shown in FIGS. 2A, 2B, and 5, the battery system mounting bracket 174 typically mounts to the front coupling arrangement upper channel member 11 2*a* of the uppermost module 111 of the battery rack mounting system 110, and may be secured thereto with ordinary screw-type fasteners (not shown) that extend through aligned apertures 174*a*, 112*c* (FIG. 4) in the mounting bracket 174 and the channel member 112*a*.

The fuseholder connector 171 mounts to the battery system mounting bracket 174. A pair of electrically non-conductive bushings 176 may be provided between the horizontally extending upper member 171*b* of the fuseholder connector 171 and the battery system mounting bracket 174. These parts may be secured together with ordinary screw-type fasteners (not shown) that extend through aligned apertures 171*d*, 174*a*, 176*a* in the upper member 171*b*, mounting bracket 174 and bushings 176. The bushings 176 electrically isolate the fuseholder connector 171 from the battery system mounting bracket 174. The vertically extending lower member 171*a* of the fuseholder connector 171 may be coupled to positive (or negative) terminals 120*a* of one of the system battery cells 120 using for example, conventional screw-threaded fasteners (not shown) that extend through apertures 171*c* in the lower member 171*a* of the fuseholder connector 171 and engage correspondingly aligned and threaded apertures 121*a* in the battery terminals 120*a* (FIG. 4).

Referring still to FIGS. 2A, 2B, and 5, the battery terminal connector mounts 173 to the horizontal support arm 172*b* of the L-shape extension 172 of the fuseholder connector 171. A second pair of electrically non-conductive bushings 175 may be provided between the L-shape extension 172 of the fuseholder connector 171 and the battery terminal connector 173. These parts may be secured together with ordinary screw-type fasteners (not shown) that extend through aligned apertures 173*a*, 172*c*, 175*a* in the battery terminal connector 173, horizontal support arm 172*b* and bushings 175. The bushings 175 electrically isolate the battery terminal connector 173 from the fuseholder connector 171. The vertical mounting flange/terminal contact arms 172*a*, 173*b* of the fuseholder connector 171 and battery terminal connector 173 may be coupled to the positive and negative terminals 162 of the fusing assembly 160 with ordinary screw-type fasteners (not shown) that extend through aligned apertures 172*d*, 173*d* in the contact arms 172*a*, 173*b* and the terminals 162 of the fusing assembly 160.

As shown in FIGS. 2A and 2B, the unfused terminal plate arrangement 180 may comprise an L-shape bracket formed by a vertically extending lower member 181 and a horizontally extending upper member 182. A vertical flange 183 projects up from a side edge of the horizontally extending upper member 182. The flange 183 includes a plurality of battery cable mounting apertures 183*a* for coupling one or more battery cables to the unfused terminal plate arrangement 180 with conventional fasteners. The unfused terminal plate arrangement 180 mounts to the battery system mounting bracket 174 in the same manner as the fuseholder connector 171. Specifically, a pair of electrically non-conductive bushings 184 may be provided between the unfused terminal connector 180 and the battery system mounting bracket 174 to electrically isolate the unfused terminal connector 180 from the battery system mounting bracket 174. These parts may be secured together with ordinary screw-type fasteners (not shown) that extend through aligned apertures 182*a*, 174*a*, 184*a* in the upper member 182, mounting bracket 174 and bushings 184. The vertically extending lower member 181 of the unfused terminal plate arrangement 180 may be coupled to negative (or positive) terminals 120*b* of another one of the system battery cells 120 using conventional screw-threaded fasteners (not shown) that extend through apertures 181*a* in the lower member 181 and engage correspondingly aligned and threaded apertures 121*b* in the battery terminals 120*b* (FIG. 4).

Still referring to FIGS. 2A and 2B, the safety covers 190 and 190' may each comprise a vertically extending lower panel 190*a*, 190*a'* and a horizontally extending upper panel 190*b*, 190*b'*. Safety cover 190 covers the fusing assembly 160, the terminal plate arrangement 170 and the safety cover 190' covers the unfused terminal plate arrangement 180, to protect against accidental contact with live electrical parts associated therewith. The lower panel 190*a* of safety cover 190 may include an access opening 191 which allows the fuseholder section 163 to be removed from the body section 161 of the fusing assembly 160 to inspect or replace the fuse 164 contained therein, and then reinstalled into the body section 161 without removing safety cover 190. A pair of elongated, electrically non-conductive spacers 192, extend up from the unfused terminal and fuseholder connectors 180, 170 and may be fastened thereto using conventional screw fasteners (not shown) which cooperate with a short threaded stud 192a at the lower end of each spacer 192. A corresponding pair of finger engageable screw type fasteners 193 each engage a threaded hole (not visible) in the upper end of each spacer 192 to removably mount safety cover 190 over the fusing assembly 160, terminal plate arrangement 170, and safety cover 190' over the unfused terminal plate arrangement 180. The safety covers 190 and 190' may be made from an electrically non-conductive, transparent material such as plastic, which allows viewing of the fusing assembly 160, the terminal plate arrangement 170 and the unfused terminal plate arrangement 180 disposed thereunder.

FIG. 4 shows a safety cover arrangement according to a second embodiment of the invention. In this embodiment, only one safety cover 290, which is substantially identical to the safety cover 190 shown in FIGS. 1, 2A, and 2B, is provided. Safety cover 290 covers only the fusing assembly 160 and the terminal plate arrangement 170.

Figure 6:
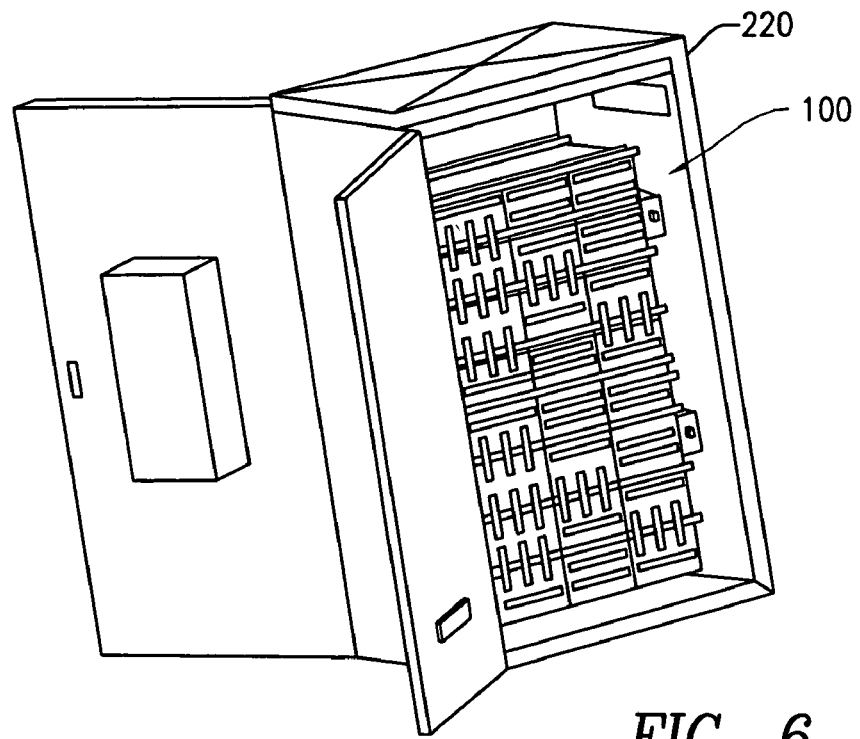
FIG. 6 is a front perspective view showing a battery cabinet application for a battery system of the type which utilizes the integrated battery fusing device of the present invention.

Referring still to FIG. 4, another aspect of the invention is a circuit breaker and power lead 200 for powering a hydrogen detector and fan (not shown). The circuit breaker and power lead 200 may be positioned in a mounting bracket 210 that attaches to the receptacle-like body section 161 of the fusing assembly 160. The circuit breaker and power lead 200 are typically utilized when the battery system 100 is installed in a battery cabinet 220 as shown in FIG. 6. The circuit breaker and power lead 200 are used for a hydrogen/purge system utilized in the cabinet 220.

Figure 7:
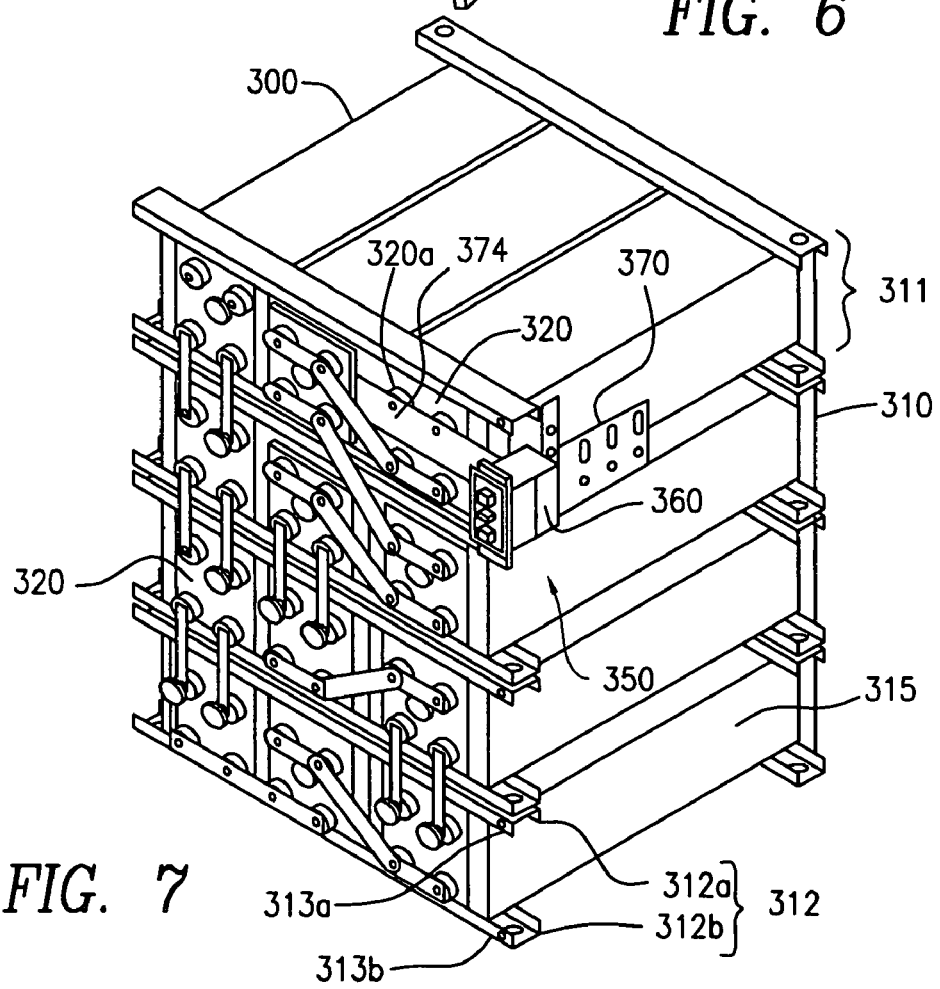
FIG. 7 shows a front perspective view of a battery system and a first side mounting embodiment of the integrated battery fusing device of the present invention coupled to the battery system.

FIG. 7 shows a perspective view of a battery system 300 and a first side mounting embodiment of the integrated battery fusing device 350 of the present invention coupled to the battery system 300. The battery system 300 is substantially identical to the battery system 100 described above and shown in FIG. 1. The integrated battery fusing device 350 may include a fusing assembly 360 and a terminal plate arrangement 370 that integrally mounts the fusing assembly 360 to a side of the battery system 300.

Figure 8:
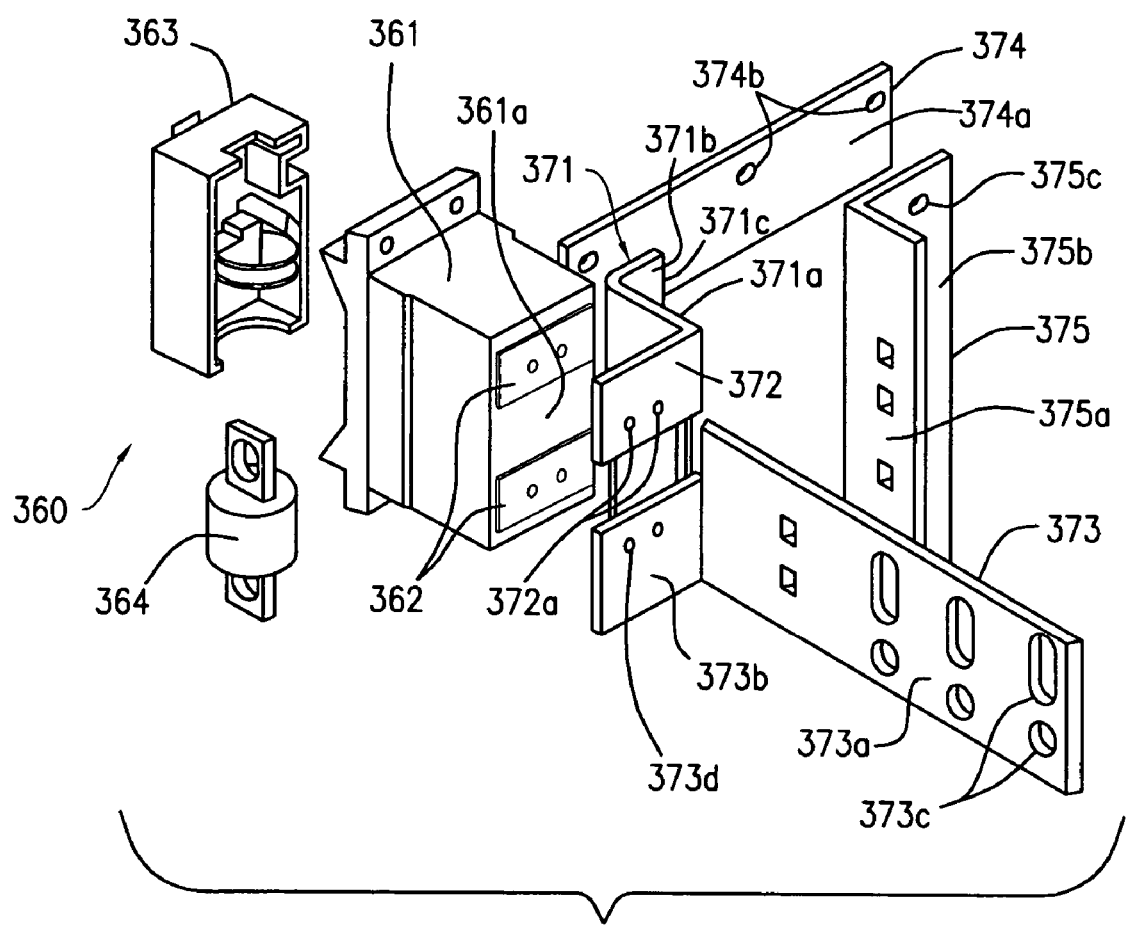
FIG. 8 is an exploded perspective rear view of the first side mounting embodiment of the integrated battery fusing device of the present invention.

Referring to FIG. 8, the fusing assembly 360 may be identical to the fusing assembly utilized in the top mounting embodiment described above and, therefore, may include a receptacle-like body section 361, a removable fuseholder section 363 that can be inserted into and removed from the body section 361, and a replaceable fuse 364 which mounts inside the fuseholder section 363. The receptacle-like body section 361 typically includes input and output terminals 362, which may be located on a rear wall 361a of the body section 361.

The terminal plate arrangement 370 of the first side mounting embodiment may include a fuseholder connector 371, a battery terminal connector 373, and first and second battery system mounting brackets 374 and 375. The fuseholder connector 371 may comprise a body portion 371a and a foot portion 371b arranged generally in a L-shape configuration, and a mounting flange/terminal contact arm 372 that extends from a rear edge of the body portion 371a in a direction opposite to the foot portion 371b. The lateral mounting flange/terminal contact arm 372 may include one or more apertures 372a that allow it to be coupled to one of the terminals 362 of the fuseholder 360 with conventional fasteners (not shown). The foot portion 371b of the fuseholder connector 371 may include one or more apertures 371c which enable the fuseholder connector 371 to be coupled to the first battery system mounting bracket 374 with conventional fasteners.

The battery terminal connector 373 includes an elongated terminal plate 373a with a plurality of apertures 373 for electrically coupling battery cables (not shown) of the battery system 300 thereto with ordinary fasteners. The elongated terminal plate 373a may include a laterally extending mounting flange/contact arm 373b that extends from a front edge of the terminal plate 373a for coupling to the other terminal 362 of the fusing assembly 360. The contact arm 373b includes one or more apertures 373d that allow it to be coupled to the other terminal 362 of the fusing assembly 360 with conventional fasteners.

The first battery system mounting bracket 374 may comprise an elongated, plate member 374a having two or more apertures 374b which allow it to be coupled to the foot portion 371b of the fuseholder connector 371 and the positive or negative terminals 320a of one of the batteries 320 of the battery system 300 (FIG. 7) with conventional fasteners (not shown).

The second mounting bracket 375 may comprise an L-shape member having a first arm member 375a and a second arm member 375b. The mounting bracket 375 may be made from an electrically insulative material such as plastic, which electrically isolates the terminal plate arrangement 370 from the rack mounting system 310. The first arm member 375a may be coupled to the battery terminal connector 373 in a transverse manner using ordinary fasteners (not shown). The second arm member 375b typically mounts to the front coupling arrangement upper and lower channel members 312a, 312b of the uppermost module of the battery rack mounting system 310, and may be secured thereto with ordinary fasteners (not shown) that extend through aligned apertures 375c, 313a, 313b in the second arm member 375b and the channel members 312a, 312b.

Figure 9:
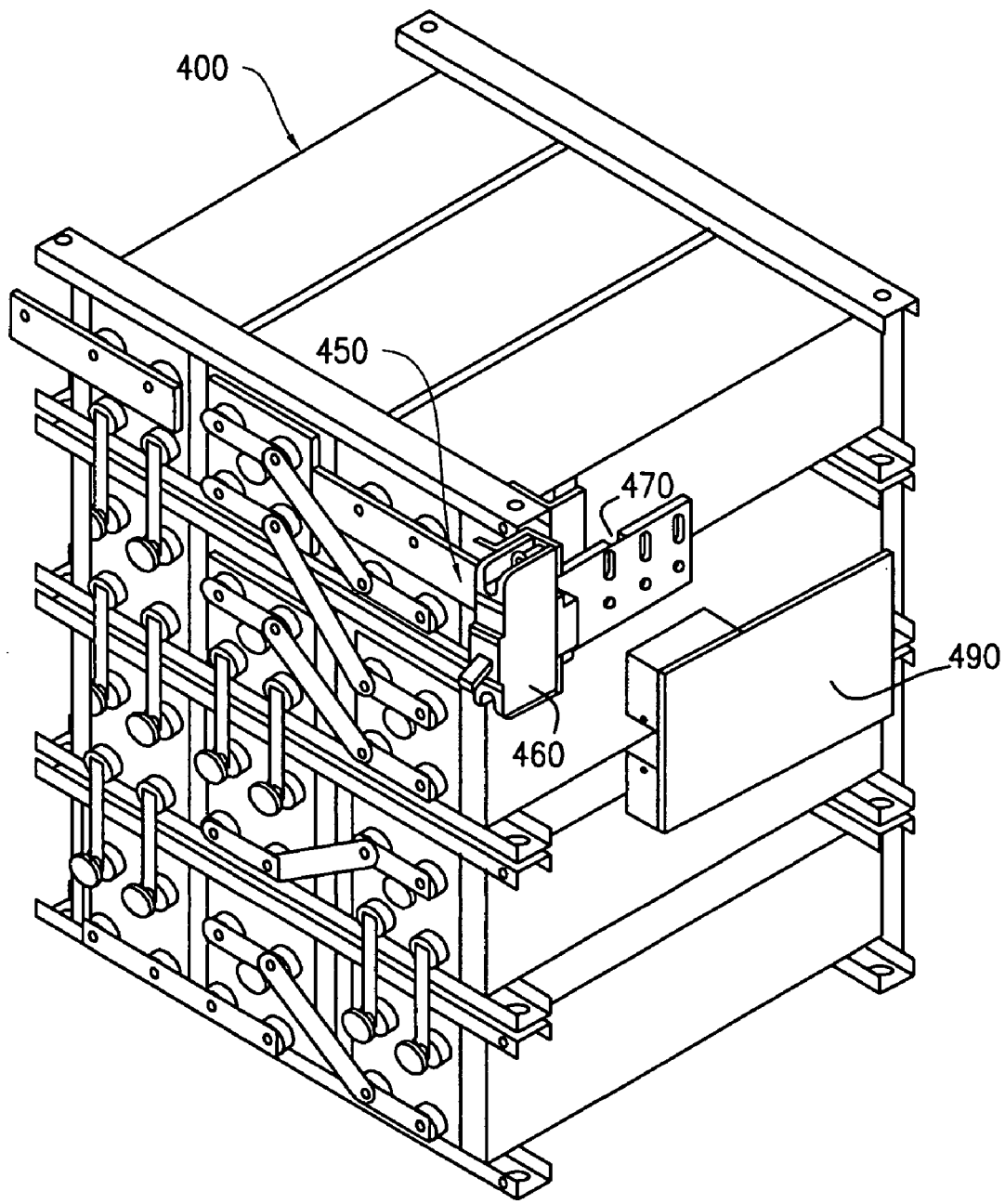
FIG. 9 shows a front perspective view of a battery system and a second side mounting embodiment of the integrated battery fusing device of the present invention wherein the fusing device comprises a circuit breaker fusing assembly.

FIG. 9 shows a perspective view of a battery system 400 and a second side mounting embodiment of the integrated battery fusing device 450 of the present invention coupled to the battery system 400. The battery system 400 is substantially identical to the battery system 100 described above and shown in FIG. 1. The integrated battery fusing device 450 may include a fusing assembly 460, which in this embodiment, comprises a conventional circuit breaker that is dimensionally similar to the pull-out fuse described earlier in the previous embodiments, and a terminal plate arrangement 470 that integrally mounts the fusing assembly 460 to a side of the battery system 400. A safety cover 490 according to a third embodiment of the invention is adapted to cover the entire fusing device 450, except for a circuit breaker switch button 463.

Figure 10A:
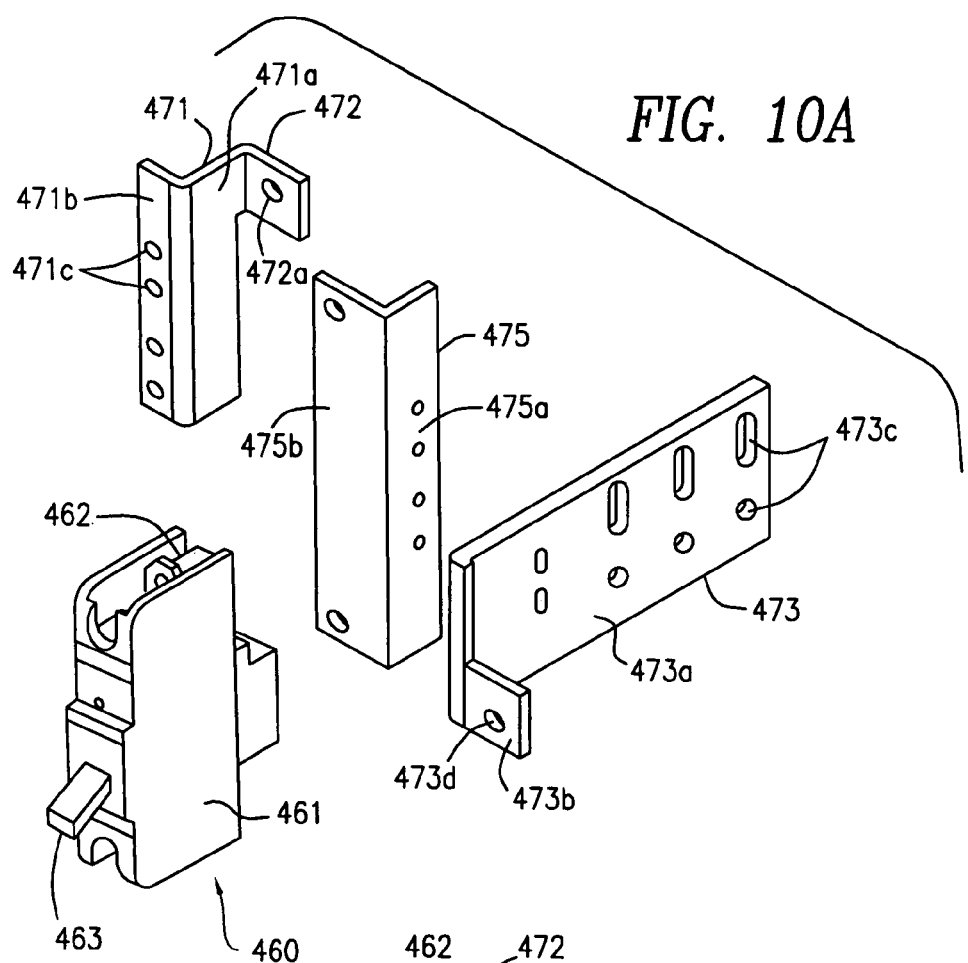
FIG. 10A is an exploded front perspective view of the integrated battery fusing device of FIG. 9.
Figure 10B:
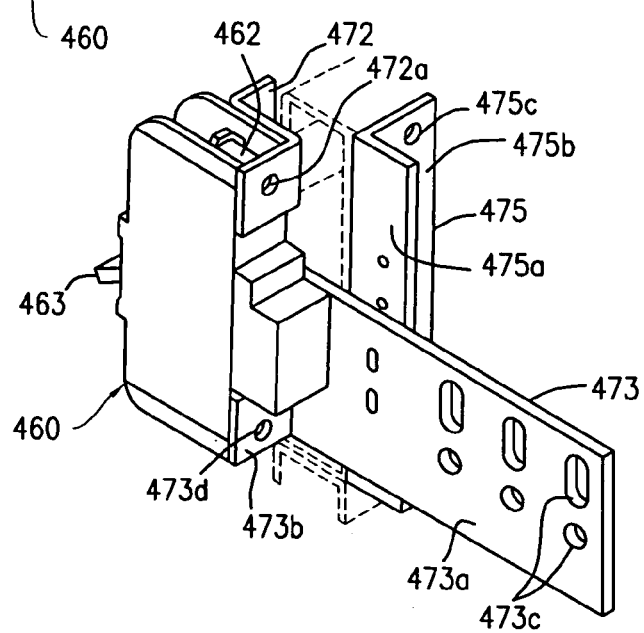
FIG. 10B is a perspective rear view of the integrated battery fusing device of FIG. 9.

Referring collectively to FIGS. 10A and 10B, the circuit breaker fusing assembly 460 may include a circuit breaker casing 461, a circuit breaker (not visible) disposed within the casing 461 that can be switched between "on" and "off" positions via the switch button 463. Input and output terminals (only the input terminal 462 is visible) are accessible at the rear of the casing 461. The circuit breaker based fusing assembly 460 may include a shunt trip that allows the circuit breaker to be electrically switched off by either a local circuit, based on low voltage, battery temperature, etc., or remotely by an emergency shut-off switch as required for certain battery system applications by the National Electrical Code. Additionally, the circuit breaker based fusing assembly 460 can be reset, rather than requiring replacement after an overcurrent condition.

The terminal plate arrangement 470 of the second side mounting embodiment may include a circuit breaker connector 471, a battery terminal connector 373, and battery system mounting bracket 475. The circuit breaker connector 471 may comprise a body portion 471a and a foot portion 471b arranged generally in a L-shape configuration, and a mounting flange/terminal contact arm 472 that extends from a rear edge of the body portion 471a in a direction opposite to the foot portion 471b. The lateral mounting flange/terminal contact arm 472 may include one or more apertures 472a that allow it to be coupled to one of the terminals of the circuit breaker 460 with conventional fasteners (not shown). The foot portion 471b of the circuit breaker connector 471 may include one or more apertures 471c which enable the circuit breaker connector 471 to be coupled to the positive or negative terminals of one of the batteries of the battery system 400 with conventional fasteners.

The battery terminal connector 473 includes an elongated terminal plate 473a with a plurality of apertures 473 for electrically coupling battery cables (not shown) of the battery system 400 thereto with ordinary fasteners. The elongated terminal plate 473a may include a laterally extending mounting flange/contact arm 473b that extends from a front edge of the terminal plate 473a for coupling to the other terminal of the circuit breaker 460. The contact arm 473b includes one or more apertures 473d that allow it to be coupled to the other terminal 462 of the fusing assembly 460 with conventional fasteners.

The mounting bracket 475 may comprise an L-shape member having a first arm member 475a and a second arm member 475b. The mounting bracket 475 may be made from an electrically insulative material such as plastic, which electrically isolates the terminal plate arrangement 470 from the rack mounting system. The first arm member 475a may be coupled to the battery terminal connector 473 in a transverse manner using ordinary fasteners (not shown). The second arm member 475b typically mounts to the front coupling arrangement upper and lower channel members of the uppermost module of the battery rack mounting system, and may be secured thereto with ordinary fasteners.

While the foregoing invention has been described with reference to the above, various modifications and changes can be made without departing from the spirit of the invention. For example, the circuit breaker fusing assembly can be used in place of the pull-out fuse fusing assembly in the top mounting embodiments described herein. In addition, the side embodiments of the battery fusing device of the invention may include the unfused terminal plate arrangement described herein. The unfused terminal plate arrangement may also be side mounted. Further, top mounted embodiments of the battery fusing device of the invention may include top or side mounted embodiments of the unfused terminal plate arrangement, and side mounted embodiments of the battery fusing device of the invention may include top or side mounted embodiments of the unfused terminal plate arrangement. These and other such modifications and changes are considered to be within the scope of the appended claims.

What is claimed is:

1. A fusing device for a battery system of the type used as a backup for powering telecommunications equipment the fusing device comprising:
    an unfused terminal plate arrangement integrally mounted to the battery system;
    a fusing assembly;
    a terminal plate arrangement that integrally mounts the fusing assembly to the battery system.

2. A fusing device for a battery system of the type used as a backup for powering telecommunications equipment, the fusing device comprising:
    an unfused terminal plate arrangement integrally mounted to the battery system;
    a fusing assembly;
    a terminal plate arrangement that integrally mounts the fusing assembly to the battery system, the terminal plate arrangement including:
        a first connector for electrically coupling the fusing assembly to the battery system; and
        a second connector for electrically coupling to the fusing assembly.

3. The fusing device according to claim 2, wherein the fusing assembly comprises a replaceable fuse.

4. The fusing device according to claim 2, wherein the fusing assembly comprises a circuit breaker.

5. The fusing device according to claim 2, further comprising a safety cover.

6. The fusing device according to claim 5, wherein the safety cover includes an opening for accessing the fusing assembly.

7. The fusing device according to claim 5, wherein the safety cover is removably mounted over the fusing assembly and the terminal plate arrangement.

8. The fusing device according to claim 5, wherein the safety cover is transparent.

9. The fusing device according to claim 2, further comprising a circuit breaker.

10. The fusing device according to claim 2, wherein the terminal plate arrangement integrally mounts the fusing assembly to a top of the battery system.

11. The fusing device according to claim 2, wherein the terminal plate arrangement integrally mounts the fusing assembly to a side of the battery system.

12. The fusing device according to claim 2, wherein the unfused terminal plate arrangement integrally mounts the fusing assembly to a top of the battery system.

13. The fusing device according to claim 2, wherein the unfused terminal plate arrangement integrally mounts the fusing assembly to a side of the battery system.

14. The fusing device according to claim 2, wherein the unfused terminal arrangement comprises a bracket.

15. The fusing device according to claim 2, further comprising a safety cover.

16. The fusing device according to claim 15, wherein the safety cover is removably mounted over the unfused terminal plate arrangement.

17. A back-up battery system for powering telecommunications equipment, the battery system comprising:
    at least one battery;
    a rack mounting system for containing the at least one battery;
    an unfused terminal plate arrangement integrally mounted to the battery system;
    a fusing device including;
    a fusing assembly; and
    a terminal plate arrangement that integrally mounts the fusing assembly to the at least one battery, the terminal plate arrangement including:
        a first connector for electrically coupling the fusing assembly to the battery system; and
        a second connector for electrically coupling a battery cable to the fusing assembly.

18. The battery system according to claim 17, wherein the fusing assembly comprises a replaceable fuse.

19. The battery system according to claim 17, wherein the fusing assembly comprises a circuit breaker.

20. The battery system according to claim 17, further comprising a safety cover.

21. The battery system according to claim 20, wherein the safety cover includes an opening for accessing the fusing assembly.

22. The battery system according to claim 20, wherein the safety cover is removably mounted over the fusing assembly and the terminal plate arrangement.

23. The battery system according to claim 20, wherein the safety cover is transparent.

24. The battery system according to claim 17, further comprising a circuit breaker.

25. The battery system according to claim 17, wherein the terminal plate arrangement integrally mounts the fusing assembly to a top of the battery system.

26. The battery system according to claim 17, wherein the terminal plate arrangement integrally mounts the fusing assembly to a side of the battery system.

27. The battery system according to claim 17, wherein the unfused terminal plate arrangement integrally mounts the fusing assembly to a top of the battery system.

28. The battery System according to claim 17, wherein the unfused terminal plate arrangement integrally mounts the fusing assembly to a side of the battery system.

29. The battery system according to claim 17, wherein the unfused terminal arrangement comprises a bracket.

30. The battery system according to claim 17, further comprising a safety cover.

31. The battery system according to claim 30, wherein the safety cover is removably mounted over the unfused terminal plate arrangement.

* * * * *